Patented Dec. 14, 1948

2,456,585

UNITED STATES PATENT OFFICE 2,456,585

PROCESS FOR THE PRODUCTION OF NITROHYDROXY COMPOUNDS

Henry B. Hass, West Lafayette, Ind., and James F. Bourland, Martinsville, N. J., assignors to Purdue Research Foundation, West Lafayette, Ind., a corporation of Indiana No Drawing. Application February 16, 1944, Serial No. 522,626

5 Claims. (Cl. 260—638)

Our invention relates to the production of nitrohydroxy compounds by the reaction of nitro hydrocarbons and aldehydes. More specifically, our invention relates to an improved method for the reaction of nitro hydrocarbons and aliphatic aldehydes to produce nitrohydroxy compounds.

The condensation of a nitro hydrocarbon with an aldehyde to form a nitro alcohol has long been known and has been the subject of a considerable amount of work. Numerous catalysts have been suggested for use in the operation, including such materials as potassium and sodium hydroxides, potassium carbonate, potassium bicarbonate, sodium methoxide, sodium ethoxide, zinc chloride, piperidine, and so forth. Several recent United States patents disclose methods of producing nitrohydroxy compounds which are marked improvements over the early prior art processes. U. S. Patent No. 2,139,120 granted December 6, 1938 to H. B. Hass and B. M. Vanderbilt discloses the use of hydroxides of alkaline earth metals as catalysts. Another patent by the same inventors (U. S. Patent No. 2,135,444 granted November 1, 1938) discloses the advantage of adding the aldehyde slowly at the desired reaction temperature to a vigorously stirred mixture of the nitro hydrocarbon and an aqueous alkaline catalyst. According to still another patent by the same inventors (U. S. Patent No. 2,132,330 granted October 4, 1938), a tertiary amine may be satisfactorily employed as a catalyst for effecting the condensation of nitro hydrocarbons and aldehydes to give nitrohydroxy compounds. Still more recently, Kamlet (U. S. Patent No. 2,151,517 granted March 21, 1939) has described a process for preparing arylnitroalkanols which comprises reacting an alkali-metal bisulfite addition-product of an aromatic aldehyde with an alkali-metal salt of a nitroalkane. All of these prior art processes possess disadvantages when used for the production of certain types of compounds. For example, the processes of Hass and Vanderbilt are highly successful for the condensation of the 1-nitroalkanes with the lower, normal aldehydes. The yields obtained fall sharply, however, when branched-chain aldehydes and nitroalkanes other than 1-nitroalkanes are used as reactants. While good yields and conversions are obtained when nitroethane is condensed with benzaldehyde by the Kamlet process, the conversions obtained when aliphatic aldehydes are condensed with nitroalkanes are much too low to make such a process generally feasible. As will be shown below, our improved process possesses a number of distinct advantages over any of these prior art processes, one of which is the marked increase in yield of nitrohydroxy compounds derived from branched-chain aldehydes.

Our new process for the condensation of aldehydes with nitro compounds to give nitrohydroxy compounds differs fundamentally from the prior processes in that it consists in effecting the condensation of the aldehyde with the nitro hydrocarbon under conditions giving rise to the formation of an aci-nitro hydrocarbon, or nitronic acid. When an acidic material is added, for example, to a solution of the sodium salt of a nitro hydrocarbon, it liberates the free aci-nitro hydrocarbon which, being unstable with respect to the normal form, slowly reverts thereto. This may be illustrated by the following equation:

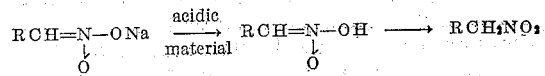

However, when in the aci-form, the nitro hydrocarbon is unstable and therefore activated. In this condition it may react with an aldehyde present before rearranging to the normal form, in accordance with the manner represented by the following equation:

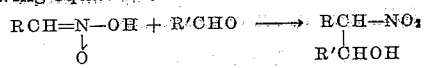

We have accordingly found that by adding to a salt of a nitro compound any suitable aldehyde-inert substance sufficiently acidic to release the free aci-form of the nitro compound and by having an aldehyde present at the moment of liberation of the free aci-form, nitrohydroxy compounds may be obtained.

As is evidenced from the above discussion, in carrying out our improved process of producing nitro-hydroxy compounds, it is important that the aldehyde and acid be added to the salt of the nitro compounds at such a rate that the aldehyde may react with the aci-nitro compound substantially as the latter is formed. Unless, however, the rate of formation of the aci-nitro compound and the rate of addition of the aldehyde are in correct proportion to each other the most satisfactory results will not be obtained, since if insufficient aldehyde is present, some of the aci-nitro compounds will revert to the ordinary form of nitrogen compound, and, hence, will no longer be in a form suitable for the reaction. If, on the other hand, too great an excess of aldehyde is present some of the latter may be lost on account of undesirable side reactions. Loss of aldehyde results if too strong an acid material is employed, and, accordingly, it is desirable to use a weak acid rather than a strong acid or a strong solution of acidic material. We prefer, for example, to use an aldehyde-inert acidic material having an effective hydrogen-ion dissociation constant in water for the first hydrogen less than $5 \times 10^{-2}$ but in excess of $1 \times 10^{-7}$, the condensation having been successfully carried out using acidic materials as strong as sodium acid sulfate and as weak as carbonic acid. The weaker acids like acetic and carbonic, however, in general, give better results than the stronger acidic materials such as sodium acid sulfate. When it is desired to use a strong acid it is preferable to employ in connection with it a suitable buffer so that the effective dissociation constant of the acidic material falls within the range above specified. In general, the concentration of the acidic material employed is of somewhat less importance than the step of adding the aldehyde and the acidic material at approximately the same rate. The aliphatic aldehydes which may be employed in carrying out the process of our invention constitute a relatively large group of compounds. As examples of suitable aldehydes there may be mentioned acetaldehyde, propionaldehyde, 2-ethyl hexaldehyde, valeraldehyde, isobutylaldehyde, isovaleraldehyde, phenyl acetaldehyde, and the like.

The nitro hydrocarbons which may be employed in carrying out our invention may be any of such compounds that have the nitro group and a hydrogen atom attached to the same carbon atom, and in this connection, it is to be strictly understood that the term "nitro hydrocarbon" appearing in the present description and in certain of the appended claims is to be construed as such. Examples of suitable nitro hydrocarbons are nitroethane, 1-nitropropane, 2-nitropropane, 1-nitrobutane, 1-nitropentane, phenyl nitromethane, nitrocyclohexane, 1-nitro-2-phenylethane, and the like.

Our improved process for the production of nitrohydroxy compounds from nitro compounds having a nitro group and hydrogen atom attached to the same carbon atom may be illustrated by the following specific examples.

*Example I*

The sodium salt of 2-nitropropane was first prepared using 45.0 parts by weight (0.5 mole) of 2-nitropropane, 20.5 parts by weight (0.52 mole) of sodium hydroxide, and 100 parts by weight of water. Carbon dioxide gas was rapidly bubbled into the solution of the sodium salt of 2-nitropropane thus prepared and maintained at a temperature of about 45° C. After the carbon dioxide had been running for a period of about one minute, the addition of 43.2 parts by weight (0.6 mole) of n-butyraldehyde was begun and continued slowly until all of the aldehyde had been added during the course of approximately 20 minutes. The addition of the aldehyde was not begun until after the carbon dioxide had been added for a short time, in order to permit the formation of some free aci-nitropropane with which the aldehyde might immediately react, thereby lessening the possibility of condensation with itself to form an aldol condensation product. After the carbon dioxide had been passed into the mixture for approximately three hours it was shut off, and the mixture allowed to stand overnight. The reaction product was then mixed with 400 parts by weight of water, and extracted with 75 parts by weight of ether. The ether extract was shaken twice with sodium bisulfite solution, then washed with sodium chloride solution, separated and, without drying, heated with steam to remove the ether. 2-methyl-2-nitro-3-hexanol was obtained by a distillation of the residue (a conversion of 55%).

*Example II*

Forty-five parts by weight (0.5 mole) of 2-nitropropane was added slowly to a vigorously stirred solution of 20.5 parts by weight (0.52 mole) of sodium hydroxide in 80 parts by weight of water, the rate of addition being so controlled as to maintain the temperature of the solution at approximately 45–50° C. When the formation of the resultant sodium aci-nitropropane was complete, a solution of 43.2 parts by weight (0.60 mole) of n-butyraldehyde in 32 parts by weight (0.53 mole) of glacial acetic acid was added over a period of 45 minutes to the vigorously agitated sodium aci-nitropropane solution. The reacting materials were at all times suspended as a fine emulsion in the reaction vessel. During the addition of the acetic acid solution, the temperature was held at approximately 45–50° C. and the vigorously stirred reaction mixture was maintained at approximately 50° C. for an additional two-hour period after all of the acetic acid solution had been added. After two hours, the oily layer which formed was separated, and the aqueous layer extracted with ether. The ether extract was then added to the separated oily layer and the latter shaken with a sodium bisulfite solution until there was no further evolution of heat, indicating that all of the aldehyde had been removed. The oil was then washed once with a dilute solution of sodium bicarbonate, then twice with a concentrated salt solution in order to facilitate separation of the oil and water layers. The resulting oil layer was then dried over anhydrous calcium chloride and steamed to remove the ether. Fractionation of the oil under reduced pressure produced 24 parts by weight of 2-methyl-2-nitro-3-hexanol, a yield of 86.2% and a conversion of 46.0%.

*Example III*

Using similar conditions and the same molar quantities, the following nitro alcohols were prepared:

| | Yield, per cent |
|---|---|
| (a) 3-nitro-4-heptanol | 88.4 |
| (b) 2,4-dimethyl-2-nitro-3-pentanol | 30.4 |
| (c) 2-ethyl-4-methyl-2-nitro-3-pentanol | 36.4 |

The nitroalcohol (a) was prepared from 1-nitropropane and n-butyraldehyde, (b) was prepared from 2-nitropropane and isobutyraldehyde, while (c) was prepared from 2-nitrobutane and isobutyraldehyde. The latter two nitro alcohols were obtained by our process in substantially higher yields than was possible by following the procedure of the Vanderbilt U. S. Patent No. 2,135,444. We have found that while, in general, the method used by Vanderbilt gives satisfactory results with the simpler condensations, our improved method is more satisfactory for the condensations employing the branched-chain aldehydes. This fact may be explained from the standpoint of reaction rates. Those condensations which give high yields probably proceed toward equilibrium at a rather rapid rate, while those giving low yields proceed only very slowly. According to our improved method apparently all condensations are accelerated to some degree, but in the case of the rapid condensations, some of the active aci-nitro compounds will rearrange to the inactive normal form before coming in contact with a molecule of aldehyde, no matter how fast the reaction.

Also, in order to clearly demonstrate the superiority of our process over that described and claimed by Kamlet, the following examples are included so that a direct comparison can be made of the yields obtained by the latter process with those secured in Examples II and III of the present application. In this connection, it should be noted that in Example III (c) of the present application, the yield of nitro alcohol derived from a branched-chain aldehyde; to wit, isobutyraldehyde, when employing our procedure was as much as 30% higher than that obtained with the same aldehyde using Kamlet's process.

*Example IV*

To 79 gm. of n-butyraldehyde was added, while stirring vigorously, a solution consisting of 125 gm. of sodium bisulfite and 400 ml. of water. A separate mixture was prepared by dissolving 89 gm. of 1-nitropropane in a solution consisting of 41 gm. of sodium hydroxide and 200 ml. of water. The resultant mixture was then added to the aqueous solution of n-butyraldehyde bisulfite addition product with vigorous agitation. During the addition of the sodium 1-nitropropane, the temperature of the reaction mixture was permitted to rise slightly above 28° C., and an orange colored oil was observed to separate almost as soon as the two solutions were mixed. When the addition of the aqueous solution of the sodium 1-nitropropane was completed, the mixture was allowed to stand over night after which the oily product layer was separated and thoroughly washed with an aqueous solution of sodium bisulfite. The oil layer thus treated was then subjected to a salting out operation with an aqueous solution of sodium chloride in the usual manner, after which the crude material was fractionally distilled under vacuum and the 3-nitro-4-heptanol boiling at 94° C. (4 mm.) obtained in 60% yield. This yield should be compared with the 88.4% yield obtained in our proces using the same aldehyde and nitroalkane; see Example III (a).

*Example V*

To the solution consisting of 103 gm. of 2-nitrobutane, 41 gm. of sodium hydroxide and 200 ml. of water was added with vigorous stirring over a period of 30 minutes to a solution consisting of 72 gm. of isobutyraldehyde, 125 gm. of sodium bisulfite and 400 ml. of water. Agitation of the reaction mixture was continued for 30 minutes after the aqueous solution of sodium 2-nitrobutane had been added. Thereafter the mixture was allowed to stand at room temperature over night. The oily product layer which separated was then processed in accordance with the procedure described in Example IV. The 3,5-dimethyl-3-nitro-4-hexanol thus produced boiled at 83–85.5° C. (4 mm.) and was obtained in a yield of 6.4%. This yield should be compared with the 36.4% yield obtained in our process with the same aldehyde and nitroalkane; see Example III (c).

In order to illustrate the use in our invention of bases other than those producing metal salts, the following example is included:

*Example VI*

Carbon dioxide was passed at a fairly rapid rate into a stirred solution of 0.5 mole of diethylamine salt of aci-2-nitropropane. At the same time 0.4 mole of n-butyraldehyde was slowly added to the solution, the temperature of which was maintained at approximately 60° C. After completing the operation in the usual manner described above, 2-methyl-2-nitro-3-hexanol was obtained in a conversion of 59%.

The calcium salts of aci-nitro hydrocarbons may also be employed, but, usually, somewhat lower conversions are obtained, and, in addition, the reaction mixtures are more difficult to treat because of the insolubility of most calcium salts. In general, the nitro hydrocarbon salts formed from primary amines are not satisfactory because of the activitiy of the latter towards aldehydes. For most purposes the nitro hydrocarbon salts of mono- and divalent metals, and of secondary and tertiary amines may be employed in our process. We prefer, however, to use the salts of the alkali metals and of the secondary amines.

The specific examples cited above for the purpose of illustrating our invention have only shown the use of the butyraldehydes. It is to be distinctly understood, however, that the process is not limited to these particular aldehydes, but as generally indicated above, it is operative with all aliphatic aldehydes susceptible of condensation with nitro hydrocarbons to produce nitro-hydroxy compounds.

In the above examples, reaction temperatures ranging from 40° C. to 65° C. have been used. Temperatures outside of this range, e. g., 40° C.–90° C., may, however, be satisfactorily employed, although we prefer to use temperatures ranging from about 60° to about 70° C. At room temperature and below, the reaction mixture should preferably be more dilute to keep the nitro hydrocarbon salt from precipitating, and, in addition, longer times should preferably be used in which to complete the operation. We have used temperatures as high as 90° C. for short periods of time without ill effect upon the condensation.

In most cases the condensations are virtually complete within two hours' time after all of the ingredients have been mixed, if the operation is carried out at the preferred temperature range of 60–70° C. It is, however, usually advisable to continue agitation for a somewhat longer period of time in order to insure higher yields and conversions.

In the procedures described in the examples above which illustrate the process of our invention, the aldehyde-inert acidifying agents and the aldehydes have been added to agitated solutions of the nitro hydrocarbon salt. We prefer to use the order of operation set forth in these examples, as we have found that this procedure usually gives better results.

This is a continuation-in-part of our co-pending application U. S. Serial No. 408,206, filed August 25, 1941, and now abandoned.

Now having described our invention, what we desire to claim is:

1. In a process for the production of aliphatic nitrohydroxy compounds, the step which comprises adding an aldehyde-inert acidic material having an effective hydrogen-ion dissociation constant in water for the first hydrogen of less than $5 \times 10^{-2}$ but in excess of $1 \times 10^{-7}$, to a solution of a salt of a nitro hydrocarbon having a nitro group and a hydrogen atom attached to a common carbon atom to produce the corresponding aci-nitro hydrocarbon, an aliphatic aldehyde being present in the mixture to react with said aci-nitro hydrocarbon before substantial conversion thereof to the normal form occurs.

2. In a process for the production of aliphatic nitrohydroxy compounds, the step which comprises simultaneously adding an aliphatic aldehyde and an aldehyde-inert acidic material having an effective hydrogen-ion dissociation constant in water for the first hydrogen of less than $5 \times 10^{-2}$ but in excess of $1 \times 10^{-7}$, to a solution of a salt of nitro hydrocarbon having a nitro group and a hydrogen atom attached to a common carbon atom.

3. In a process for the production of aliphatic nitro hydrocarbons, the step which comprises simultaneously adding an aliphatic aldehyde and carbon dioxide to a solution of a salt of an aliphatic nitro hydrocarbon having a nitro group and a hydrogen atom attached to a common carbon atom.

4. In a process for the production of aliphatic nitro hydrocarbons, the step which comprises simultaneously adding an aliphatic aldehyde and acetic acid to a solution of a salt of an aliphatic nitro hydrocarbon having a nitro group and a hydrogen atom attached to a common carbon atom.

5. The process of claim 3 in which the aliphatic aldehyde is n-butyraldehyde and the nitro hydrocarbon is 2-nitropropane.

HENRY B. HASS.
JAMES F. BOURLAND.

REFERENCES CITED

The following references are of record in the file of this patent:

UNITED STATES PATENTS

| Number | Name | Date |
|---|---|---|
| 2,135,444 | Vanderbilt | Nov. 1, 1938 |
| 2,139,120 | Hass et al. | Dec. 6, 1938 |
| 2,151,517 | Kamlet | Mar. 21, 1939 |